(12) United States Patent
Chen

(10) Patent No.: US 10,821,634 B2
(45) Date of Patent: Nov. 3, 2020

(54) METHOD FOR COMPRESSION-MOLDING FOAMED POLYMER ARTICLE

(71) Applicant: OTRAJET INC., Taichung (TW)

(72) Inventor: Ching-Hao Chen, Taichung (TW)

(73) Assignee: OTRAJET INC., Taichung (TW)

(*) Notice: Subject to any disclaimer, the term of this patent is extended or adjusted under 35 U.S.C. 154(b) by 399 days.

(21) Appl. No.: 15/674,728

(22) Filed: Aug. 11, 2017

(65) Prior Publication Data

US 2019/0022902 A1    Jan. 24, 2019

(30) Foreign Application Priority Data

Jul. 19, 2017   (TW) .............................. 106124045 A

(51) Int. Cl.
| | | |
|---|---|---|
| *B29C 43/00* | (2006.01) | |
| *B29C 43/36* | (2006.01) | |
| *B29K 105/04* | (2006.01) | |

(52) U.S. Cl.
CPC ............ *B29C 43/003* (2013.01); *B29C 43/36* (2013.01); *B29C 43/361* (2013.01); *B29C 2043/3613* (2013.01); *B29K 2105/04* (2013.01)

(58) Field of Classification Search
CPC ..... B29C 43/203; B29C 43/003; B29C 43/36; B29C 2043/3613; B29C 43/361; B29K 2105/04

See application file for complete search history.

(56) References Cited

U.S. PATENT DOCUMENTS

| | | | | |
|---|---|---|---|---|
| 3,676,033 | A * | 7/1972 | Buonaiuto | B29C 44/0446 425/174 |
| 3,787,278 | A * | 1/1974 | Ready | B29C 44/0446 428/218 |
| 4,304,810 | A * | 12/1981 | Gates | B29C 44/0446 264/45.4 |
| 4,584,230 | A * | 4/1986 | Saegusa | B29C 44/0446 264/45.1 |
| 5,177,824 | A * | 1/1993 | Ou | B29D 35/122 12/146 B |
| 5,466,405 | A * | 11/1995 | Viertel | B29C 65/562 264/45.4 |

(Continued)

FOREIGN PATENT DOCUMENTS

| | | |
|---|---|---|
| CN | 102574316 | 7/2012 |
| CN | 102712112 | 10/2012 |

(Continued)

*Primary Examiner* — Joseph S Del Sole
*Assistant Examiner* — Jerzi H Moreno Hernandez
(74) *Attorney, Agent, or Firm* — Guice Patents PLLC

(57) ABSTRACT

The present invention provides a method for compression-molding a foamed polymer article, where compared with the shape of a final product to be molded, a foamed blank article has a redundant protruding part at a particular position, which is different from the shape of the final product; and when the foamed blank is hot-melt-molded again by using a mold, an external force is applied to compress the redundant protruding part to reduce the volume and increase the density, so that the final product obtained has a higher density at the position corresponding to the redundant protruding part than other parts. Thereby, the final product can have different densities at different positions, so as to meet the requirements in practical application.

6 Claims, 1 Drawing Sheet

(56) References Cited

U.S. PATENT DOCUMENTS

| | | | | |
|---|---|---|---|---|
| 6,045,345 A | * | 4/2000 | Eder | B29C 44/0446 |
| | | | | 425/4 R |
| 2011/0086216 A1 | * | 4/2011 | Lim | B29C 44/0446 |
| | | | | 428/304.4 |
| 2011/0089134 A1 | * | 4/2011 | Morton | B29C 43/36 |
| | | | | 215/353 |
| 2016/0039162 A1 | * | 2/2016 | Murphy | B29C 43/02 |
| | | | | 521/170 |

FOREIGN PATENT DOCUMENTS

| | | | | | |
|---|---|---|---|---|---|
| JP | S6120727 A | * | 1/1986 | | |
| JP | S6317013 A | * | 1/1988 | | B29C 44/10 |

* cited by examiner

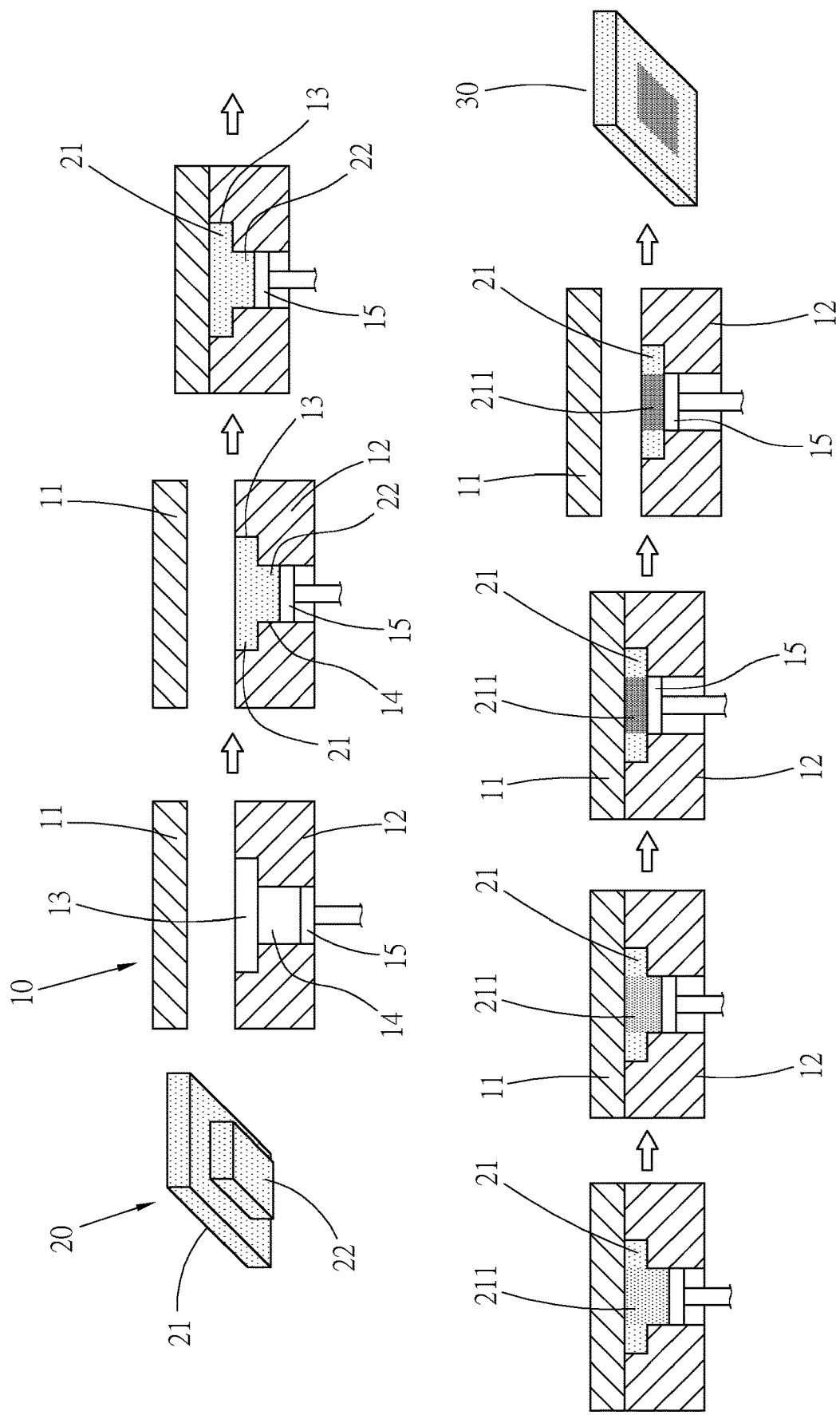

METHOD FOR COMPRESSION-MOLDING FOAMED POLYMER ARTICLE

BACKGROUND OF THE INVENTION

1. Field of the Invention

The present invention relates to a polymer molding technology, and in particular, to a method for compression-molding a foamed polymer article.

2. Description of the Related Art

As the expansion ratios of thermoplastic polymer foams such as ethylene vinyl acetate (EVA) are difficult to control, practical product requirements cannot be met after primary molding and foaming, and secondary processing including heating and compression-molding needs to be carried out in order to obtain industrial products with stable quality. In the prior art, the detailed technical contents of a method for performing secondary processing on a foam that has been subjected to primary processing are as disclosed in Chinese Patent No. CN1074856A, where a foamed blank of a size and shape close to those of the final product is molded by a primary processing procedure, and then the foamed blank is placed into a secondary processing mold to undergo a secondary processing procedure including heating and compression molding as well as cooling and setting. In the secondary processing procedure, the blank is heated and melt-molded into a final product of a preset size and shape by means of heating and compression molding, followed by cooling and setting.

To ensure the stability of the size and shape of the final product after the secondary processing procedure, the space of the mold cavity of the secondary processing mold of the same size and shape as those of the final product needs to be filled up with the foamed blank, so as to ensure the integrity of the final product molded using the secondary processing mold. However, such molded final products have a single density only, and cannot have different densities at different parts.

Furthermore, in the prior art, to obtain a final product that has different densities at different parts, different foamed blanks having different expansion ratios or densities are placed inside the space of a same mold cavity of the secondary processing mold at the same time, and the above-mentioned secondary processing procedure is carried out to melt the different foamed blanks together to obtain a final product. However, the quality of such multi-density final products obtained by joining is not desirable.

SUMMARY OF THE INVENTION

Accordingly, a main objective of the present invention is to provide a method for compression-molding a foamed polymer article, where compared with the shape of a final product to be molded, a foamed blank article has a redundant protruding part at a particular position, which is different from the shape of the final product; and when the foamed blank is hot-melt-molded again by using a mold, an external force is applied to compress the redundant protruding part to reduce the volume and increase the density, so that the final product obtained has a higher density at the position corresponding to the redundant protruding part than other parts. Thereby, the final product can have different densities at different positions, so as to meet the requirements in practical application.

In view of the above, in order to achieve the above objective, the method for compression-molding a foamed polymer article that is provided by the present invention includes the following steps:

Step a: Providing a mold.

The mold has a mold cavity, an extension cavity adjacent to and in communication with the mold cavity and having an inner diameter smaller than the inner diameter of the mold cavity, and a movable member movable in the extension cavity under an external force.

Step b: Opening the mold, followed by filling.

The mold is opened, and a prefoamed blank article is filled into the mold. The blank article has a first block and a second block that are integrally molded. The first block is located inside the mold cavity. The second block protrudes out of a local part of the first block, and is located inside the extension cavity and between the first block and the movable member.

Step c: Closing the mold, following by melt-molding.

The mold is closed, heat and pressure are provided to the mold to hot-melt-mold the blank article, and an external force is applied to cause the movable member to move inside the extension cavity, so as to compress the second block. Thereby, the blank article is melt-molded into the same shape as that of the final product by using the mold, and the compressed state of the second block is maintained.

Step d: Cooling and setting.

The temperature of the melt-molded blank article is reduced. After cooling and setting, the mold is opened and the melt-molded blank article is taken out.

After the second block is compressed, the melt-molded final product has different densities at different parts, so as to meet the requirements in practical application.

When the second block is compressed, the second block is caused to move from the extension cavity toward the mold cavity, so that the local part of the first block is also compressed due to the entrance of the second block.

In addition, the reduction in volume and the increase in density caused by compression varies with the compression ratio. Therefore, the density can be adjusted by changing the degree of compression.

When the movable member moves from the extension cavity to the junction between the extension cavity and the mold cavity to block the communication between the extension cavity and the mold cavity, the second block completely enters the space of the mold cavity.

BRIEF DESCRIPTION OF THE DRAWINGS

FIG. 1 is a schematic flow chart of a preferred embodiment of the present invention.

10: mold; 11: upper mold; 12: lower mold; 13: mold cavity; 14: extension cavity; 15: movable member; 20: blank article; 21: first block; 211: local part of first block; 22: second block; 30: final product.

DETAILED DESCRIPTION OF THE PREFERRED EMBODIMENTS

Herein, a preferred embodiment of the present invention is given and illustrated in detail with reference to the accompanying drawings.

A method for compression-molding a foamed polymer article that is provided in a preferred embodiment of the present invention includes the following steps:

Step a: Providing a mold 10.

The mold 10 has: an upper mold 11 and a lower mold 12 that are vertically stacked; a mold cavity 13 between the upper mold 11 and the lower mold 12; an extension cavity 14, provided inside the lower mold 12, having one end in communication with the mold cavity 13, and having an inner diameter smaller than the inner diameter of the mold cavity 13; and a movable member 15, which is a slide block slidably connected to a circumferential wall of the extension cavity 14 by means of its circumferential end face, and capable of reciprocating linear displacement inside the extension cavity 14 toward or away from the mold cavity under an external force.

Step b: Opening the mold.

The upper mold 11 and the lower mold 12 are separated apart from each other, so as to expose the mold cavity 13 and the extension cavity 14.

Step c: Filling.

A prefoamed blank article 20 is placed into the mold 10 in the open state, so that a first block 21 of the blank article 20 is located inside the mold cavity 13, and a second block 22 of the blank article 20 protrudes out of a local part 211 of the first block 21 and is embedded in the extension cavity 14.

The first block 21 and the second block 22 of the blank article 20 are a foam formed by integral molding of a same raw material. Specifically, the first block 21 is a three-dimensional quadrilateral block, and the second block 22 protrudes out of the local part 211 of the first block 21.

Step d: Closing the mold.

The upper mold 11 and the lower mold 12 are closed, so that the first block 21 fills up the mold cavity 13, and the second block 22 is embedded in the extension cavity 14 and between the mold cavity 13 and the movable member 15.

Step e: Heating, applying pressure, and melt-molding.

Heat and pressure are provided to the mold 10 to increase the temperature of the blank article 20, so that the blank article 20 can be heated and melt inside the mold 10 and takes the shape of the mold cavity 13.

Step f: Forming different densities.

When the melt-molding procedure in the step e is carried out to such an extent that the blank article 20 can be molded, an external force is applied to drive the movable member 15 to move toward the mold cavity 13, so as to push the second block 22 toward the mold cavity 13, so that the second block 22 can be moved from the extension cavity 14 into the mold cavity 13. As the second block 22 moves, the local part 211 of the first block is continuously compressed. Thereby, a force can be applied to the second block 22 by means of the movable member 15, to compress the second block 22 and the local part 211 of the first block, so as to increase the density of these parts.

In this embodiment, the external force is continuously applied to the movable member 15 until the movable member 15 moves to the junction between the extension cavity 14 and the mold cavity 13. When the movable member 15 moves to the junction and blocks the communication between the extension cavity 14 and the mold cavity 13, the second block 22 is completely pushed into the mold cavity 13. Thereby, the blank article 20 can have different densities at different parts.

Step g: Cooling.

After the blank article 20 is molded in the mold 10 into the shape of the mold cavity 13 and the densities of the second block 22 and the local part 221 of the first block adjacent to the second block 22 are controlled by means of the movable member 15, the remolded blank article 20 can be cooled and set by means of water cooling, air cooling or other cooling methods, so as to obtain a multi-density final product 30 of the same shape as that of the mold cavity 13.

Thereby, although the blank article fabricated in advance in the foaming procedure has similar densities at different parts due to its fixed expansion ratio, the implementation of the above-mentioned method can change the blank article originally having a single density into an article having different densities at different parts. Compared with the prior art where a multi-density foamed article is fabricated by means of joining, the technical content provided in the present invention can improve the quality of the final product.

In addition, in the prior art, the size of the blank article is increased in order to ensure the integrity of the final product. When the blank article is squeezed into the space of the mold cavity of the secondary processing mold with a small volume, the change in density is not sufficient because the difference between the size and the volume is not large enough. In other words, as only a small compression effect is achieved by means of the difference between the size and the volume, there is no teaching or disclosure in the prior art about changing the density by means of the difference between the size and the volume. Therefore, the present invention has an inventive step as compared with the prior art.

What is claimed is:

1. A method comprising the steps of: placing a prefoamed blank article into a mold cavity inside a mold, hot-melt-molding the prefoamed blank article in the mold cavity, and cooling and setting to give a final product;
    wherein the mold further comprises an extension cavity, adjacent to and in communication with the mold cavity and having an inner dimension smaller than an equivalent inner dimension of the mold cavity, and a movable member movable in the extension cavity under an external force;
    wherein in the step of placing the prefoamed blank article into the mold cavity inside the mold, the prefoamed blank article is a prefoamed article having a first block and a second block that are integrally molded, the first block of the prefoamed blank article is a three-dimensional quadrilateral block, the second block protrudes out of a central part of the first block, when the prefoamed blank article is inside the mold, the first block of the prefoamed blank article is located inside the mold cavity and the second block of the prefoamed blank article is located inside the extension cavity between the movable member and the first block;
    wherein in the step of hot-melt-molding the prefoamed blank article, the external force is applied to cause the movable member to move inside the extension cavity, the moveable member exerting a pressure on the second block causing the second block to move toward the mold cavity and compressing the second block and the central part of the first block, wherein when being compressed, the second block partially or completely moves from the extension cavity into the mold cavity such that the central part of the first block is compressed together with the second block, and
    wherein a region of the final product in which the first block is compressed together with the second block has a density different from regions of the final product in which the first and second blocks are not compressed together.

2. The method according to claim 1, wherein the first block fills up a space of the mold cavity.

3. The method according to claim 1, wherein the second block fills up a space of the extension cavity before being compressed by the movable member.

4. The method according to claim 1, wherein the pressure exerted by the movable member to compress the second block is maintained until the cooling procedure.

5. The method according to claim 1, wherein the first block and the second block are made of a same raw material.

6. The method according to claim 1, wherein the movable member is a slide block, and is capable of reciprocating displacement inside the extension cavity under the external force.

\* \* \* \* \*